（12）United States Patent
Oppermann et al.

(10) Patent No.: US 7,010,975 B2
(45) Date of Patent: Mar. 14, 2006

(54) BALANCING MACHINE WITH A CLAMPING DEVICE

(76) Inventors: Harald Oppermann, Gartenstrasse 42, Burgwedel/Wettmar (DE) 30938; Guy Carter, 3 Westalpark, Cheltenham (GB) Glos Gl 513 BL ( * ) Notice: Subject to any disclaimer, the term of this patent is extended or adjusted under 35 U.S.C. 154(b) by 27 days.

(21) Appl. No.: 10/885,694

(22) Filed: Jul. 8, 2004

(65) Prior Publication Data
US 2005/0005686 A1 Jan. 13, 2005

(30) Foreign Application Priority Data
Jul. 9, 2003 (DE) ................................. 103 31 129

(51) Int. Cl.
*G01M 1/06* (2006.01)
(52) U.S. Cl. .......................... 73/487; 157/21
(58) Field of Classification Search ................ 157/14, 157/21; 73/487, 460, 462; 301/5.21
See application file for complete search history.

(56) References Cited

U.S. PATENT DOCUMENTS

| 4,093,311 | A | * | 6/1978 | Maus | ...................... | 301/35.61 |
| 4,188,828 | A | * | 2/1980 | Cuccolini | ..................... | 73/460 |
| 4,332,169 | A | * | 6/1982 | Stuart | ......................... | 73/487 |
| 4,462,253 | A | * | 7/1984 | Becher | ......................... | 73/487 |
| 4,478,081 | A |   | 10/1984 | Greene |  |  |
| 6,481,281 | B1 | * | 11/2002 | Gerdes | ........................ | 73/460 |
| 6,619,120 | B1 | * | 9/2003 | Hansen | ....................... | 73/487 |

FOREIGN PATENT DOCUMENTS

| DE | 29506853 U | 6/1995 |
| EP | 1296124 A2 | 3/2003 |

* cited by examiner

*Primary Examiner*—Hezron Williams
*Assistant Examiner*—John C Hanley
(74) *Attorney, Agent, or Firm*—Crowell & Moring LLP

(57) ABSTRACT

A balancing machine with a clamping device for mounting a vehicle wheel on a balancing machine shaft. The clamping device has a mounting flange (7) with multiple recesses (13) for receiving at least one centering pin (8). To reduce centering errors and/or balancing errors because of play between the centering pin (8) and the mounting flange (7), e.g., due to manufacturing tolerances or wear, the centering pin has an elastically deformable circumference (21) which in its operating position is in contact with a wall surface (25) of the mounting flange (7) bounding the recess (13). The circumference (21) can be either hydraulically or mechanically deformable. In addition, the invention also relates to a balancing machine having a mounting flange (7) having a central opening for axial guidance on a shaft. To equalize any play between the mounting flange (7) and the shaft, the opening is bounded by an elastically deformable wall area which in the operating position of the mounting flange is in contact with the shaft.

22 Claims, 5 Drawing Sheets

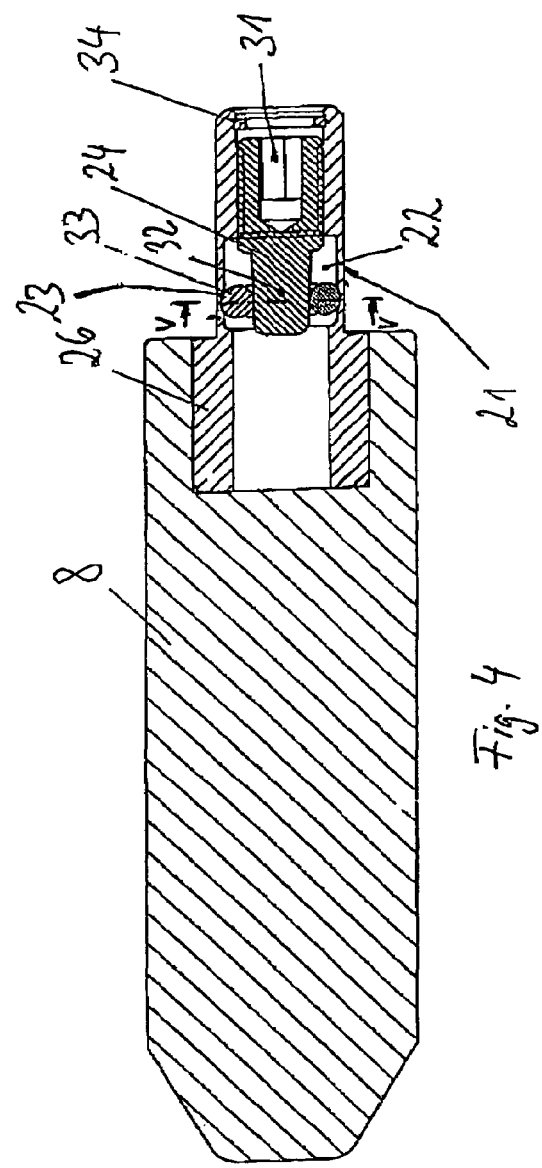
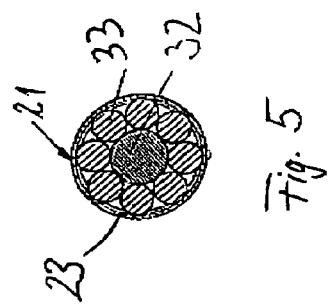

BALANCING MACHINE WITH A CLAMPING DEVICE

BACKGROUND OF THE INVENTION

This invention relates to a balancing machine with a clamping device for mounting a vehicle wheel on a shaft of the balancing machine with a mounting flange which can be secured in particular in different positions on the shaft and has a plurality of recesses for removable fixation of at least one centering pin, in which, in an operating position, the end section of the centering pin which protrudes from the recess engages in an associated mounting hole in the vehicle wheel. In addition, this invention relates to a balancing machine with a clamping device for mounting a vehicle wheel on a shaft of the balancing machine with a mounting flange which can be secured in particular in different positions on the shaft and which has an opening for axial guidance on the shaft.

German Utility Model no. 295 06 853 U1 discloses a clamping device for mounting wheels of different types of vehicles on a shaft of a balancing machine. The clamping device has a mounting flange with a central opening for axially guiding the vehicle wheel on the shaft. In addition, several groups of recesses are provided in the mounting flange to accommodate centering pins. The centering pins are detachably secured in one of the groups of recesses corresponding to the arrangement of holes in the vehicle wheel to be mounted. At one end section, these centering pins engage in the mounting holes of the vehicle wheel that serve the function of centering. A tension nut placed on the shaft is used to bring the vehicle wheel (i.e., the rim) into position with its back side in close contact with a supporting flange of the balancing machine. Due to the supporting flange, the rim is aligned in a plane perpendicular to the axis of the balancing machine and is centered radially by the centering pins that engage in the centering holes and/or mounting holes of the vehicle wheel.

It has proven to be a disadvantage that play between the centering pins and the mounting flange and/or between the mounting flange and the shaft is unavoidable due to wear and due to tolerances in the manufacture of the centering pins and the associated recesses in the mounting flange and/or the central opening for axial guidance of the mounting flange and the shaft of the balancing machine. When centering vehicle wheels or rims, this results in centering errors and consequently in balancing errors from the balancing machine.

SUMMARY OF THE INVENTION

It is an object of the present invention to provide an improved balancing machine for balancing vehicle wheels and the like.

Another object of the invention is to provide a balancing machine which reduces centering errors in mounting vehicle wheels and consequently decreases balancing errors in balancing on the balancing machine.

These and other objects are achieved in accordance with the present invention by providing a balancing machine with a clamping device for mounting a vehicle wheel on a shaft, said clamping device having a mounting flange which can be secured in different positions on the shaft and which has multiple recesses for detachable fixation of at least one centering pin, wherein in an operating position an end section of the centering pin, which protrudes from a recess in which the centering pin is mounted, engages in an associated mounting hole in the vehicle wheel, and wherein the centering pin has an elastically deformable circumference in at least some sections which in the operating position is in contact with a mounting flange wall surface which borders the recess.

In accordance with a further aspect of the invention, the objects are achieved by providing a balancing machine with a clamping device for mounting a vehicle wheel on a shaft, said clamping device having a mounting flange which can be secured in different positions on the shaft and which has an opening for axially fixing the mounting flange on the shaft, wherein the opening is bounded by a mounting flange wall area which is elastically deformable in at least some sections and which is in contact with the shaft when the mounting flange is in operating position.

Advantageous refinements and preferred embodiments of the balancing machine of the invention are described in further detail hereinafter.

Thus, according to this invention, a balancing machine is provided in which the centering pin has a circumference that is elastically deformable in at least some sections and in the operating position is in contact with a wall surface of the mounting flange that borders the recess. This creates the possibility of compensating the play between the centering pin and the mounting flange due to manufacturing tolerances and inaccuracies in the manufacture of the centering pins and/or the recesses in the checking flange and thus to reduce centering errors in mounting and/or balancing errors in balancing the vehicle wheel. Wear on the pin and/or the mounting flange resulting from use can thus be compensated by adjustment and/or adaptation of the circumference of the centering pin to the respective recess in the mounting flange.

A particularly effective refinement of the present balancing machine is achieved by making the circumference hydraulically deformable. This ensures a uniform deformation of the circumference of the centering pin and thus achieves very accurate fits between the centering pin and the mounting flange.

It has proven especially advantageous for the centering pin to have a fluid-filled pressure chamber bounded in at least some sections by an elastically deformable wall. The elastic deformation of the circumference of the centering pin is achieved in this case in an especially simple manner as a result of an internal hydraulic pressure which is generated in the centering pin and acts on the wall bounding the pressure chamber. In the elastic deformation of the circumference, the material of the wall bounding the pressure chamber is deformed in the elastic range. The fluid used to apply the pressure may be any incompressible fluid known to persons skilled in the art, for example, hydraulic oil, water or a gel.

Another advantageous refinement is achieved by arranging an adjustable pressure element which acts on the fluid in the pressure chamber. The adjustable pressure element makes it possible to apply the precise internal pressure in the centering pin that is necessary to compensate for the play between the functionally positioned centering pins and the mounting flange. Due to the integration of the pressure chamber and the pressure element in the centering pin, a very compact system is made available for deforming the circumference of the centering pin.

It has proven to be especially practical for the pressure element to be adjustable in the operating position of the centering pin. Due to the adjustment of the pressure element in the operating position, that is to say when the centering pin is arranged in the recess of the mounting flange, the play between the centering pin and the mounting flange can be compensated especially effectively. This ensures a very accurate fit between the components.

It has proven to be especially simple in this case for the centering pin to have an actuating element on its end face for adjusting the pressure element. In this way the pressure element can be adjusted through the recess in the mounting flange when the centering pin is in the operating position.

It has proven especially effective here that at least one gasket is provided for the pressure chamber. A loss of fluid, in particular hydraulic oil, can be prevented in this way and it is possible to ensure the required internal pressure for deformation of the wall surface.

Another particularly advantageous modification of the balancing machine of the present invention is achieved by making the circumference mechanically deformable. Due to the mechanical deformation, a simple and thus also very inexpensive alternative to adjustment of the circumference of the centering pin and/or for the reduction in play between the mounting flange and the centering pin is made available.

An especially advantageous refinement is achieved by providing the centering pin with a pressure chamber which is bounded by a wall that is elastically deformable in at least some sections and arranging an adjustable pressure element in the pressure chamber. Due to the adjustable pressure element, the internal pressure on the wall in the centering pin, which is necessary for equalization of the play between the centering pin and the mounting flange, can be adjusted very accurately. A particularly compact system is created due to the arrangement of the pressure element in the centering pin.

It has found to be particularly practical for the pressure element to have a ring-shaped expansion element which is situated on a conically shaped body and is in contact in at least some sections with the elastically deformable wall bounding the pressure chamber. In an adjustment of the conically shaped body, the pressure is applied directly to the wall bounding the pressure chamber via the respective expansion element. Due to the linear mobility of the conically shaped body, the pressure on the wall which is necessary because of the play prevailing between the components can be adjusted with precision by the associated expansion element.

It has proven to be particularly simple for the expansion element to have a plurality of balls arranged in a ring pattern. By means of these steel balls, the mechanically deformable wall which bounds the pressure chamber can be pressed radially outwardly.

Another particularly practical embodiment arises from the fact that the pressure element is adjustable in the functional position of the centering pin. Due to the adjustment of the pressure element when the centering pin is in its functional position (i.e, when the centering pin is arranged in the recess of the mounting flange), the play between the centering pin and the mounting flange can be compensated particularly effectively. This ensures a very precise fit between the components.

It has proven to be particularly simple for the centering pin to have an actuating element on the end for adjustment of the pressure element. In this way, when the centering pin is in it operating position, the pressure element can be adjusted through the recess in the mounting flange.

Furthermore, a device is provided in accordance with the invention in which the opening is bordered by a wall area of the mounting flange which is elastically deformable in at least some sections and which is in contact with the shaft when the mounting flange is in an operating position. This makes it possible to compensate for play between the mounting flange and the shaft of the balancing machine because of manufacturing tolerances and inaccuracies and/or to compensate for wear resulting from use and thereby further reduce the centering errors in mounting and/or balancing errors in balancing.

It has thereby been found to be particularly advantageous that the wall area is hydraulically deformable. The hydraulic deformation results in a very uniform deformation of the wall area of the mounting flange and thus a very precise contact of the wall area of the opening and/or of the mounting flange with the shaft. Due to the resulting very accurate fit between the mounting flange and the shaft, centering errors and/or balancing errors can be further minimized.

It has proven particularly advantageous that the mounting flange has at least one fluid-filled pressure chamber which is bounded in at least some sections by the elastically deformable wall area. In this case, the elastic deformation of the wall area occurs due to an internal pressure created in the mounting flange and acting on the wall area. The fluid used here may be any incompressible fluid known to persons skilled in the art, for example, hydraulic oil, water or a gel.

Another embodiment which is also particularly advantageous is achieved by providing an adjustable pressure element which acts on the fluid in the pressure chamber. In this way, the internal pressure which is required for the elastic deformation of the wall area and which compensates for the play between the shaft and the mounting flange can be precisely adjusted in the mounting flange and/or in the pressure chamber. By integrating the pressure chamber into the mounting flange, a compact system is provided for equalizing the play between the functional components and/or for reducing centering errors in mounting a vehicle wheel.

It has proven to be particularly practical for the pressure element to be adjustable when the mounting flange is in the operating position. By adjusting the mounting flange and/or the wall area of the mounting flange when it is arranged on the shaft, very accurate adjustments between the components can be achieved.

In this case, it has proven particularly simple for the mounting flange to have an actuating element on the its end face end for adjusting the pressure element. This permits an adjustment of the pressure element when the clamping flange is arranged in the operating position on the shaft.

In an especially effective embodiment, at least one gasket is provided for the pressure chamber. This makes it possible to prevent loss of the fluid and assure accurate adjustment of the internal pressure.

Another embodiment of the balancing machine of the invention which is also particularly advantageous is achieved by making the wall area mechanically deformable. This provides a simple and consequently inexpensive alternative for deformation of the wall area and therefore for reducing the play between the mounting flange and the shaft.

In another embodiment, the mounting flange has a plurality of pressure chambers which are equally distributed on a circular path concentric with the opening. This results in an even more precise adjustment of the opening in the mounting flange to the shaft of the balancing machine and even more effectively reduces centering errors in mounting the vehicle wheel.

BRIEF DESCRIPTION OF THE DRAWINGS

The invention will be described in further detail hereinafter with reference to illustrative preferred embodiments shown in the accompanying drawing figures in which:

FIG. 4 is an enlarged sectional diagram of a second embodiment of a centering pin according to the invention;

FIG. 5 is a sectional view of the centering pin of FIG. 4 taken along line V—V;

DETAILED DESCRIPTION OF PREFERRED EMBODIMENTS

Figure 1:
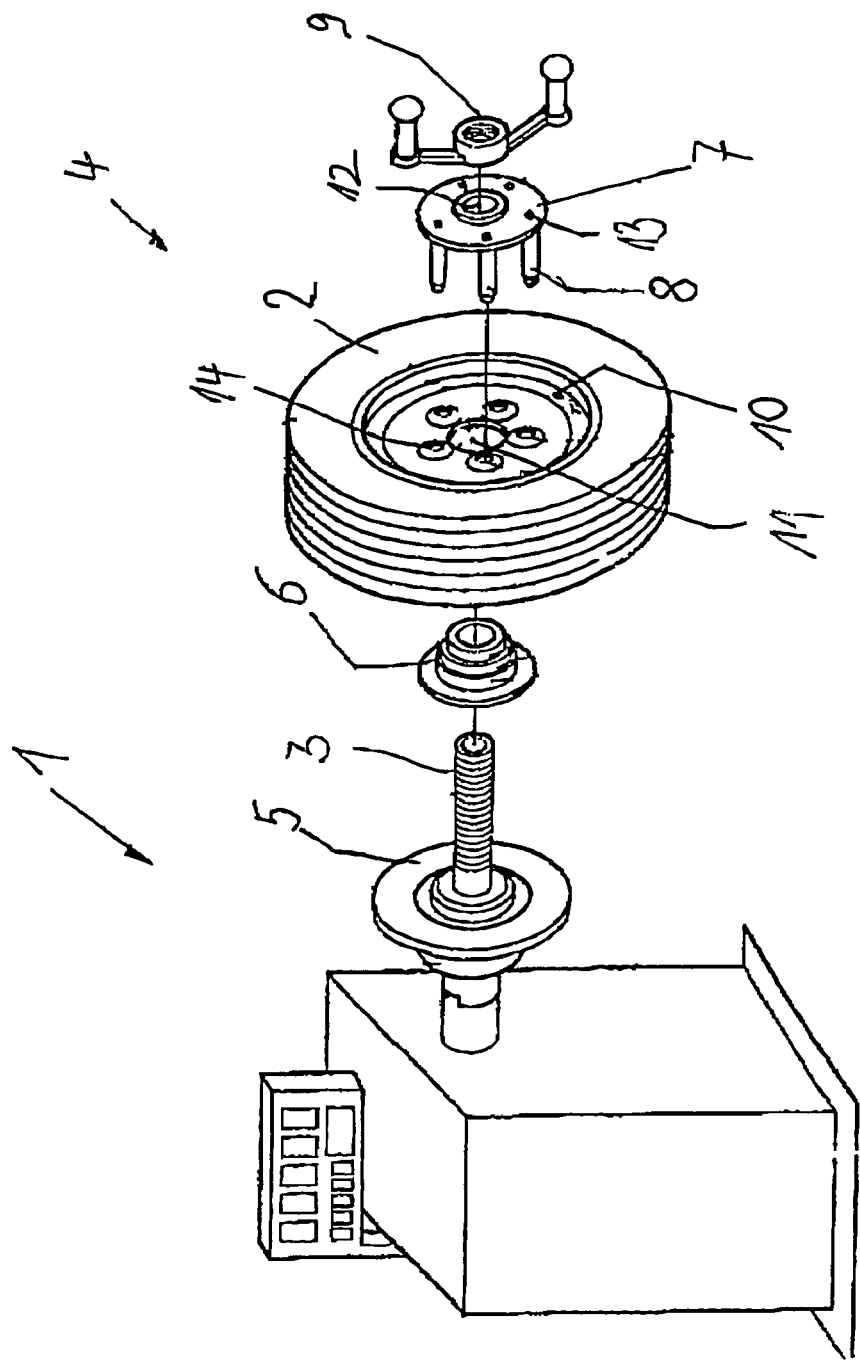
FIG. 1 is a perspective view of a basic diagram of a balancing machine according to the invention.

FIG. 1 shows a basic diagram of a balancing machine 1 according to the invention in a perspective view. The balancing machine 1 has a driven shaft 3 and a clamping device 4 for mounting a vehicle wheel 2 that is to be balanced. A supporting flange 5 is provided for the driven shaft 3. In order to balance a vehicle wheel 2, the shaft 3 has the following arranged on it in this order: a centering ring 6, the vehicle wheel 2 to be balanced, a mounting flange 7 with centering pins 8 and a clamping nut 9. To this end, a wheel rim 10 of the vehicle wheel 2 has a central opening 11 and the mounting flange 7 has a central opening 12. The centering pins 8 are detachably secured in recesses 13 in the mounting flange 7 in such a way that the centering pins 8 engage in respective fastening holes 14 on the rim 10 in mounting the vehicle wheel 2 and/or the rim 10. Therefore, the mounting flange 7 has various groups of recesses 13 so that the centering pins 8 are inserted exactly into the group of recesses 13 which correspond to the arrangement of mounting holes 14 in the rim 10 and/or the vehicle wheel 2.

Figure 2:
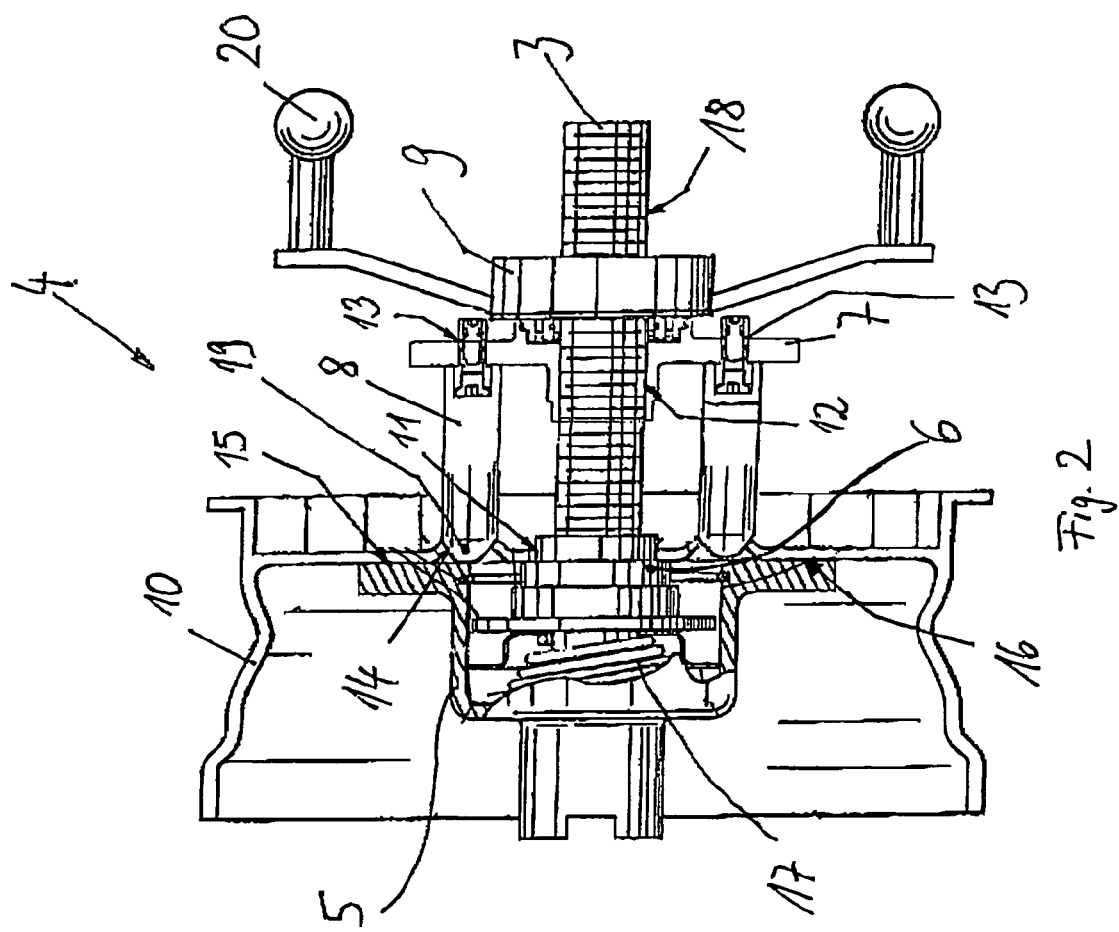
FIG. 2 is a sectional view of a clamping device with a vehicle wheel centered on the balancing machine.

FIG. 2 shows a sectional view of the clamping device 4 with a vehicle wheel 2 centered on the balancing machine 1. The supporting flange 5 arranged on the shaft 3 has a supporting surface 15 with which a supporting surface 16 of the rim 10 is in contact. A spring 17 is provided on the shaft 3, pressing the centering ring 6 into the central opening 11 in the wheel rim 10 during the mounting operation. The mounting flange 7 is displaceably mounted on the thread 18 of the shaft 3 so it is displaceable in the central opening 12. In the centering process, the centering pins 8 inserted into the mounting flange 7 and/or into the recesses 13 in the mounting flange 7 become engaged in the respective mounting holes 14 in the wheel rim 10 by means of an end section 19 that protrudes with respect to the recess 13. For mounting the clamping device 4, the tension nut 9 has handle grips 20.

Centering and/or balancing errors occur in mounting the vehicle wheel 2 due to a play between the centering pin 8 and the mounting flange 7 and/or between the mounting flange 7 and the shaft 3, e.g., because of manufacturing tolerances and/or wear. To equalize this play, the centering pins 8 and/or the mounting flange 7 is/are designed to be hydraulically and/or mechanically readjustable.

Figure 3:
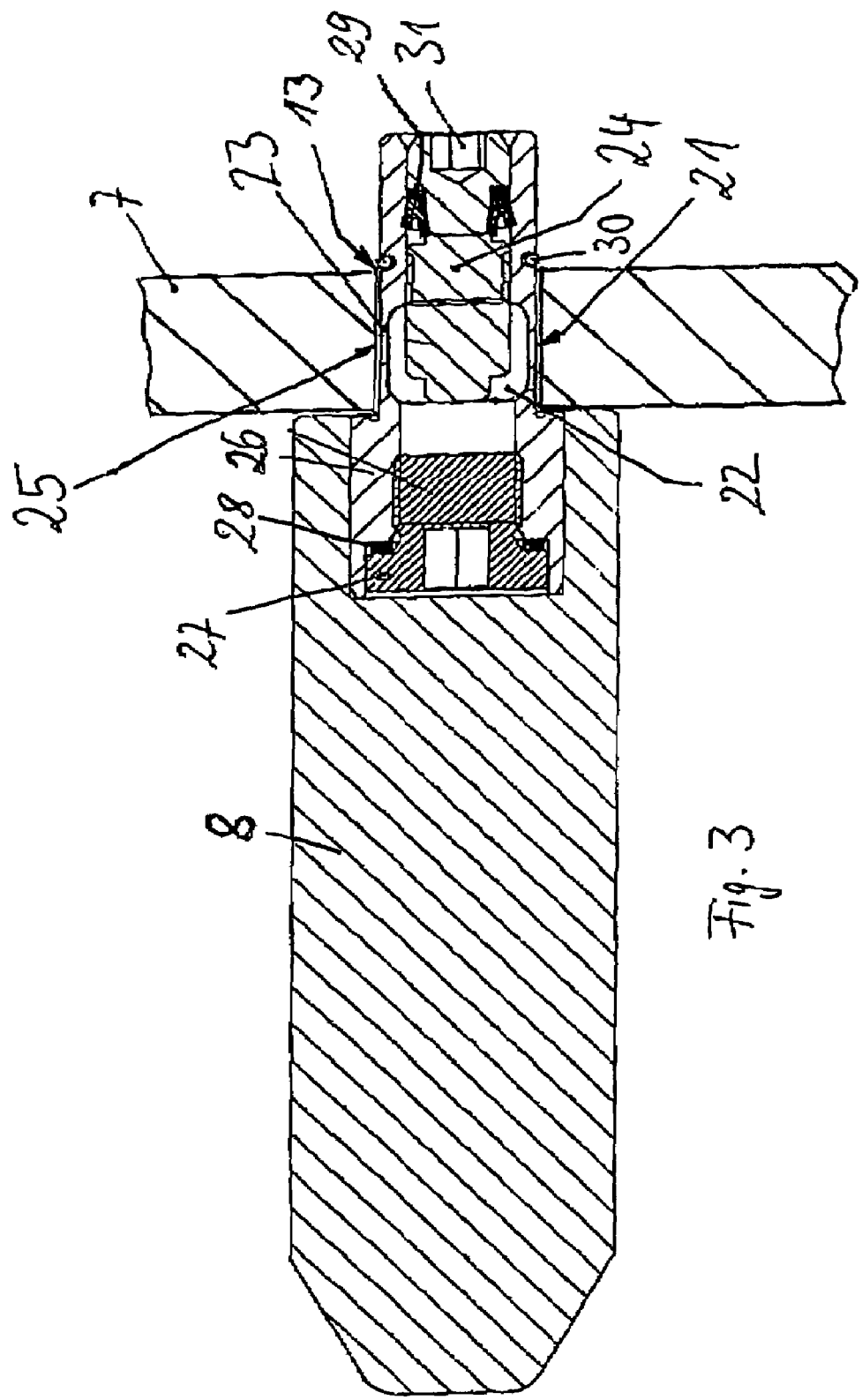
FIG. 3 is an enlarged sectional diagram of a centering pin according to the invention.

FIG. 3 is an enlarged sectional view of a centering pin 8 in its operating position, i.e., in a position in which it is inserted into the recess 13 in the mounting flange 7. To equalize the play between the centering pin 8 and the mounting flange 7, a circumference 21 of the centering pin 8 is designed to be elastically deformable. To this end, the centering pin 8 has a pressure chamber 22 which is filled with a fluid, in particular a hydraulic oil, water or a gel. The pressure chamber 22 is bordered in at least some sections by an elastically deformable wall 23. Due to an adjustable pressure element 24 acting on the fluid, an internal pressure acting on the wall 23 is established. This internal pressure causes radial distension of the wall 23 in the elastic area, thereby deforming the circumference 21 of the centering pin 8 in such a way that the circumference 21 is in contact with the wall surface 25 bordering the recess 13 of the mounting flange 7 without any play. The wall 23 bordering the pressure chamber 22 is formed by a cylindrical shaft 26 which is connected to the centering pin 8 by a shrink fit, for example. The pressure chamber 22 is in static contact with one side by gaskets 27, 28 and is dynamically sealed on the other side by a gasket 29. A locking ring 30 situated on the shaft 26 prevents the centering pin 8 from falling out of the mounting flange 7. The linearly adjustable pressure element 24 is adjustable by means of an operating element 31 arranged on the end.

FIG. 4 shows a second embodiment of a centering pin 8 in an enlarged sectional diagram and FIG. 5 shows a diagram of the centering pin 8 in a section along line V—V in FIG. 4. The circumference 21 of the centering pin 8 is mechanically deformed here. A pressure element 24 is arranged in the pressure chamber 22 and has a conical body 32 and a ring-shaped expansion element 33 arranged on the body 32. The expansion element 33 is comprised of multiple steel balls which are pressed radially outward with a linear adjustment of the pressure element 24 and/or the conical body 32 and which deform the wall 23 in the elastic area bordering the pressure chamber 22. Therefore the circumference 21 of the centering pin 8 also undergoes elastic deformation. The pressure element 24 is linearly adjustable by means of an operating element 31. To prevent the pressure element 24 from becoming loosened, a locking ring 34 is provided in the end area of the centering pin 8. The wall 23 bordering the pressure chamber 22 is formed by a cylindrical shaft 26 which is connected to the centering pin 8 by a shrink fit, for example.

Figure 6:
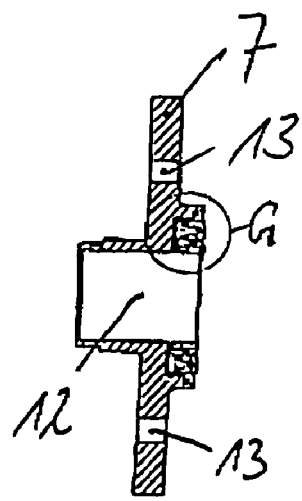
FIG. 6 is a sectional view of the mounting flange of FIG. 2.

FIG. 6 shows the mounting flange 7 depicted in FIG. 2 in a sectional view with the centrally arranged opening 12 and the recesses 13 to accommodate one centering pin 8 each.

Figure 7:
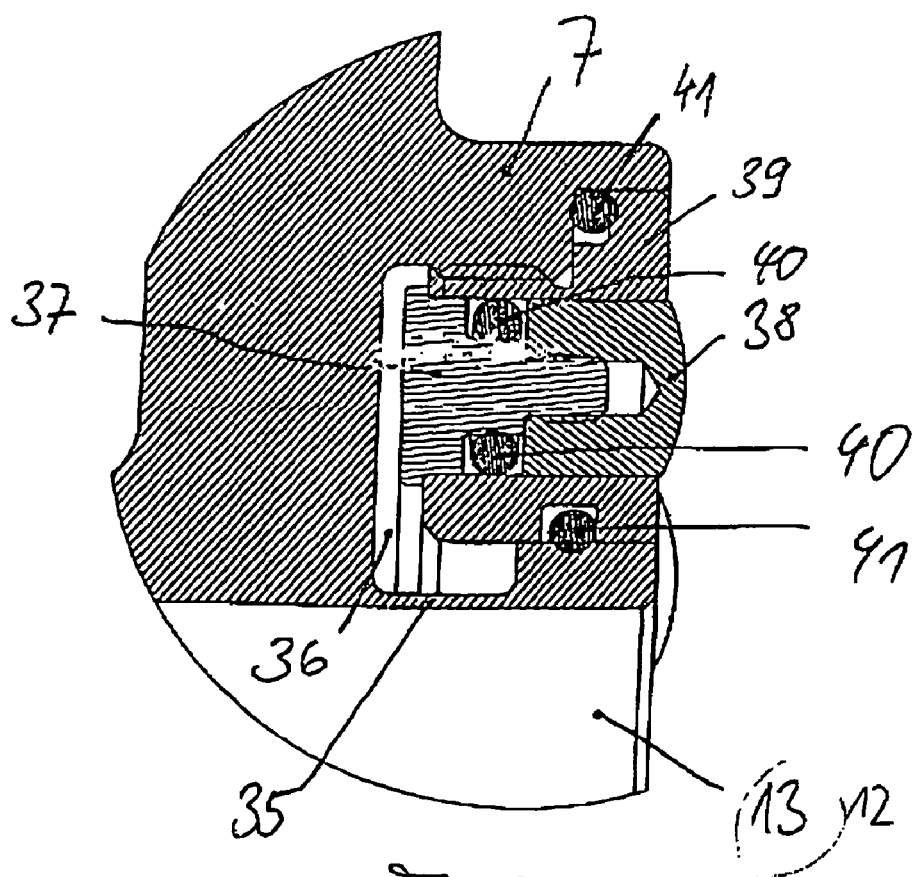
FIG. 7 is an enlarged detail view the detail G from FIG. 6.

FIG. 7 shows the detail G from FIG. 6 in an enlarged view. The opening 13 is bordered in at least some sections by an elastically deformable wall area 35 of the mounting flange 7. This wall area 35 also borders a pressure chamber 36 which is filled with a fluid, in particular hydraulic oil, water or a gel. By means of an adjustable pressure element 37 which is also arranged in this pressure chamber 36 and acts on the fluid, an internal pressure P1 may be adjusted in the pressure chamber 36 acting on the wall area 35. Because of this internal pressure, this wall area 35 undergoes elastic deformation, so that the wall area 35 is in contact with the shaft 3 with no play. This reduces centering errors and balancing errors due to play between the mounting flange 7 and the shaft 3. Deformation of the mounting flange 7 and/or the wall area 35 occurs in the operating position and/or the centering position of the mounting flange 7, i.e., in a position arranged on the shaft 3. For linear adjustment of the pressure element 37, the mounting flange has an operating means 38 on the end. The pressure element 37 and the operating means 38 are secured in the mounting flange 7 by a pressure ring 39. The pressure chamber 36 is sealed by the respective gaskets 40, 41 provided for this purpose. The pressure ring 39 establishes a starting pressure P0 in the pressure chamber 36, although the wall area 35 is not yet deformed. Only in the operating position of the mounting flange 7 is the internal pressure PI adjusted in the pressure chamber 36 by the operating means 38 and the pressure element 37, causing elastic deformation of the wall area 35 so that the latter is in contact with the shaft 3 with no play.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A balancing machine comprising a clamping device for mounting a vehicle wheel on a shaft, said clamping device having a mounting flange which can be secured in different positions on the shaft and which has multiple recesses for detachable fixation of at least one centering pin, wherein in an operating position an end section of the centering pin, which protrudes from a recess in which the centering pin is mounted, engages in an associated mounting hole in the vehicle wheel, and wherein the centering pin has an selectively adjustable circumference in at least some sections which in the operating position is in contact with a mounting flange wall surface which borders the recess.

2. A balancing machine according to claim 1, wherein the circumference of the centering pin is hydraulically deformable.

3. A balancing machine according to claim 1, wherein the centering pin has a pressure chamber which is filled with a fluid and which is bounded in at least some sections by an elastically deformable wall.

4. A balancing machine according to claim 3, wherein an adjustable pressure element which acts on the fluid is provided in the pressure chamber.

5. A balancing machine according to claim 4, wherein the pressure element is adjustable when the centering pin is in the operating position.

6. A balancing machine according to claim 4, wherein the centering pin has an actuator element on an end face thereof for adjusting the pressure element.

7. A balancing machine according to claim 3, wherein the pressure chamber is provided with at least one gasket.

8. A balancing machine according to claim 1, wherein the circumference of the centering pin is mechanically deformable.

9. A balancing machine according to claim 1, wherein the centering pin has a pressure chamber bounded in at least some sections by an elastically deformable wall, and an adjustable pressure element is arranged in the pressure chamber.

10. A balancing machine according to claim 9, wherein the pressure element has a ring-shaped expansion element arranged on a conical body, said expansion element being in contact in at least some sections with the elastically deformable wall bounding the pressure chamber.

11. A balancing machine according to claim 10, wherein the expansion element comprises a plurality of balls arranged in a ring.

12. A balancing machine according to claim 9, wherein the pressure element is adjustable when the centering pin is in operating position.

13. A balancing machine according to claim 9, wherein the centering pin has an actuating element on an end face thereof for adjusting the pressure element.

14. A balancing machine comprising a clamping device for mounting a vehicle wheel on a shaft, said clamping device having a mounting flange which can be secured in different positions on the shaft and which has an opening for axially fixing the mounting flange on the shaft, wherein the opening is bounded by a mounting flange wall area which is selectively radially adjustable by elastic deformation in at least some sections and which is in contact with the shaft when the mounting flange is in operating position.

15. A balancing machine according to claim 14, wherein the wall area is hydraulically deformable.

16. A balancing machine according to claim 14, wherein the mounting flange has at least one pressure chamber filled with a fluid and which is bounded in at least some sections by an elastically deformable flange wall area.

17. A balancing machine according to claim 16, wherein an adjustable pressure element which acts on the fluid is provided in the pressure chamber.

18. A balancing machine according to claim 17, wherein the pressure element is adjustable when the mounting flange is in the operating position.

19. A balancing machine according to claim 17, wherein the mounting flange has an actuator element on an end thereof for adjusting the pressure element.

20. A balancing machine according to claim 16, wherein the pressure chamber is provided with at least one gasket.

21. A balancing machine according to claim 14, wherein the flange wall area is mechanically deformable.

22. A balancing machine according to claim 16, wherein the mounting flange is provided with a plurality of pressure chambers equally distributed on a circular path concentric with said opening.

* * * * *